W. F. SCHACHT.
WASHER.
APPLICATION FILED APR. 24, 1915.
1,266,324.
Patented May 14, 1918.
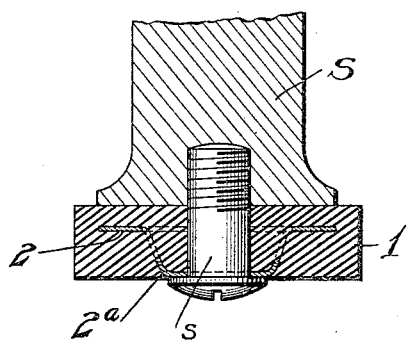
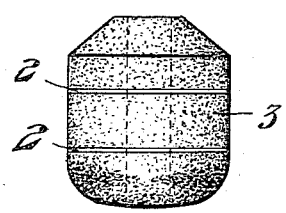
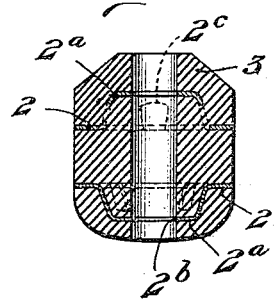
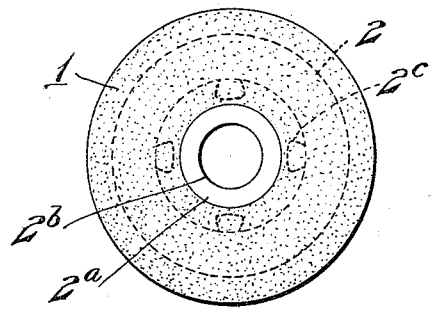
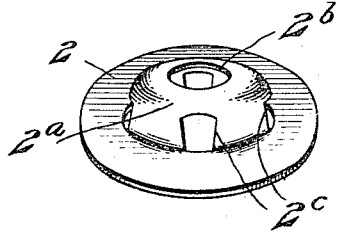
Witnesses
Inventor
William F. Schacht
By Sowell & Sowell
Attorneys

UNITED STATES PATENT OFFICE.

WILLIAM F. SCHACHT, OF HUNTINGTON, INDIANA.

WASHER.

1,266,324.  Specification of Letters Patent.  Patented May 14, 1918.

Application filed April 24, 1915. Serial No. 23,611.

*To all whom it may concern:*

Be it known that I, WILLIAM F. SCHACHT, a citizen of the United States, residing at Huntington, in the county of Huntington and State of Indiana, have invented certain new and useful Improvements in Washers; and I hereby declare that the following is a full, clear, and exact description thereof, reference being had to the accompanying drawings, which form part of this specification.

This invention is a novel improvement in washers of the kinds ordinarily used in valves and faucets; and the object of the invention is to provide a metal-reinforced washer, the metal reinforce greatly enhancing the durability of the washer by preventing distortion thereof, equalizing pressure thereon, and lessening the rubbing and cutting of the washer. Such washers may be made of rubber, fiber or composition, and the invention is especially intended for use with rubber washers, and the rubber being vulcanized to the metal reinforce renders such washers very durable. The ordinary washers, as heretofore constructed, have been easily worn out, and they must be made of several grades differing in hardness according to the use for which the washers are intended.

I will describe the invention as illustrated in the accompanying drawings, and summarize in the claims the essential features thereof for which protection is desired.

In said drawings:—

Figure 1 is a magnified sectional view of a part of a valve stem with one of my improved metal-reinforced bib washers applied thereto.

Fig. 2 is a bottom view of a bib washer detached.

Fig. 3 is a view of the metal reinforce detached.

Fig. 4 is a side view of such a bib washer.

Fig. 5 is a side view of a reinforced "Fuller" washer, and

Fig. 6 is a vertical sectional view thereof.

Referring to Fig. 1, S designates the stem of an ordinary valve, and 1 designates a bib washer secured thereto by a screw $s$ in the usual manner. These washers may be made of any desired thickness and diameter; and are usually made in disk-form and correspond in size to the seats of the valves or faucets wherein they are to be used; and they are usually provided with a central opening for the passage of the securing screw $s$. Bib washers constructed in accordance with my invention have embedded therein a metal-reinforce 2 which is preferably made of brass, or other non-corrosive metal, and also preferably has a central hollow dished portion or boss $2^a$ which is approximately partiglobular in contour and is provided with an aperture $2^b$ in its crown and may be provided with apertures $2^c$ in its side walls. Such a reinforce 2 is embedded in each washer 1 and may be entirely concealed therein, but preferably is so located that the crown of the boss $2^a$ comes to the surface of the lower face of the washer, and forms practically a metallic bushing in the washer around the screw $s$. The main part or flange 2 of the metal reinforce is embedded in the washer, as shown, and is preferably practically permanently connected thereto by vulcanizing the rubber or fiber after the reinforce is embedded therein.

When fastened to the valve stem S the crown of the reinforce acts as a metal bushing around the screw $s$ and distributes the pressure from the screw head uniformly throughout the washer, instead of the screw merely pinching the parts of the washer directly opposite such head. Such reinforce greatly increases the bearing of the screw head upon the washer and prevents cutting out of the material of the washer under the head of the screw.

When the washer is seated by the closing of the valve the pressure is largely transmitted through the reinforce 2, which resists the tendency of the material of the washer to buckle or break under pressure.

As shown in Figs. 5 and 6 the "Fuller" washers 3 are preferably provided with two such metal reinforces 2, 2, which are arranged reversely with their crowns extending toward the adjacent ends of the washer.

By means of said reinforces the washers are stiffened both vertically and horizontally, and such metal-reinforced washers can be cheaply manufactured and are much more durable than the ordinary washers; and such reinforced washers will not readily cut or disintegrate, and they can be used for either hot or cold water. I do not however consider the invention restricted to the particular form of metal reinforce shown in the drawings, nor to the specific disk-form of washer illustrated.

What I claim is:

1. A rubber or composition washer having a metal reinforce embedded therein said reinforce consisting of a disk having a central hollow parti-globular raised boss forming a bushing for the fastening screw and provided with openings in its crown and side, substantially as described.

2. A rubber or composition washer having a pair of disk-like metal reinforce embedded therein, each reinforce having a boss projecting toward the adjacent outer end of the washer and adapted to form a bushing for the washer, substantially as described.

3. A metal reinforce for washers and the like consisting of a metal disk having a central hollow parti-globular raised boss provided with radial openings in its side and an axial opening, substantially as described.

In testimony that I claim the foregoing as my own, I affix my signature in presence of two witnesses.

WILLIAM F. SCHACHT.

Witnesses:
M. J. KROGEN,
M. K. BAKER.

Copies of this patent may be obtained for five cents each, by addressing the "Commissioner of Patents, Washington, D. C."